(12) United States Patent  (10) Patent No.: US 8,917,005 B2
Rahman et al.  (45) Date of Patent: Dec. 23, 2014

(54) ROTOR BARRIER SHAPING FOR DEMAGNETIZATION MITIGATION IN AN INTERNAL PERMANENT MAGNET MACHINE

(75) Inventors: Khwaja M. Rahman, Troy, MI (US); Sinisa Jurkovic, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 363 days.

(21) Appl. No.: 13/315,846

(22) Filed: Dec. 9, 2011

(65) Prior Publication Data

US 2013/0147302 A1 Jun. 13, 2013

(51) Int. Cl.
*H02K 1/27* (2006.01)

(52) U.S. Cl.
USPC .................................. 310/156.57; 310/156.53

(58) Field of Classification Search
CPC ......... H02K 1/27; H02K 1/272; H02K 1/274; H02K 1/2753; H02K 1/276; H02K 1/2766
USPC ............. 310/156.43, 156.45, 156.48, 156.53, 310/156.57
See application file for complete search history.

(56) References Cited

U.S. PATENT DOCUMENTS

| | | | |
|---|---|---|---|
| 5,990,593 A * | 11/1999 | Narita et al. ............. | 310/156.53 |
| 6,703,746 B2 | 3/2004 | Biais et al. | |
| 6,741,003 B2 * | 5/2004 | Naito et al. .............. | 310/156.53 |
| 6,794,784 B2 * | 9/2004 | Takahashi et al. ....... | 310/156.56 |
| 7,474,029 B2 * | 1/2009 | Rahman et al. .......... | 310/156.56 |
| 7,843,100 B2 | 11/2010 | Blissenbach et al. | |
| 7,902,711 B2 | 3/2011 | Blissenbach et al. | |
| 2009/0140592 A1 * | 6/2009 | Rahman et al. .......... | 310/156.53 |
| 2009/0224624 A1 | 9/2009 | Kumar et al. | |
| 2010/0237735 A1 * | 9/2010 | Blissenbach et al. .... | 310/156.53 |
| 2011/0198959 A1 | 8/2011 | Vyas | |

FOREIGN PATENT DOCUMENTS

| | | |
|---|---|---|
| JP | 2000270503 A | 9/2000 |
| JP | 2008199790 A | 8/2008 |
| JP | 2010178535 A | 8/2010 |

* cited by examiner

*Primary Examiner* — Michael Andrews
(74) *Attorney, Agent, or Firm* — Quinn Law Group, PLLC

(57) ABSTRACT

A rotor core for an Internal Permanent Magnet (IPM) machine includes a cavity having a magnet disposed therein. The cavity defines an air slot adjacent a radially outermost edge of the magnet disposed therein. A leakage flux path extends across the air slot and connects opposing sides of the cavity. The leakage flux path is oriented in an approximate tangential relationship relative to an axis of rotation of the rotor core, and is angled relative to the radially outermost edge of the magnet disposed within the cavity to direct flux away from the magnet. The cavity further includes an air pocket disposed along a radial inner surface of the magnet relative to the axis of rotation, adjacent the air slot of the cavity.

20 Claims, 2 Drawing Sheets

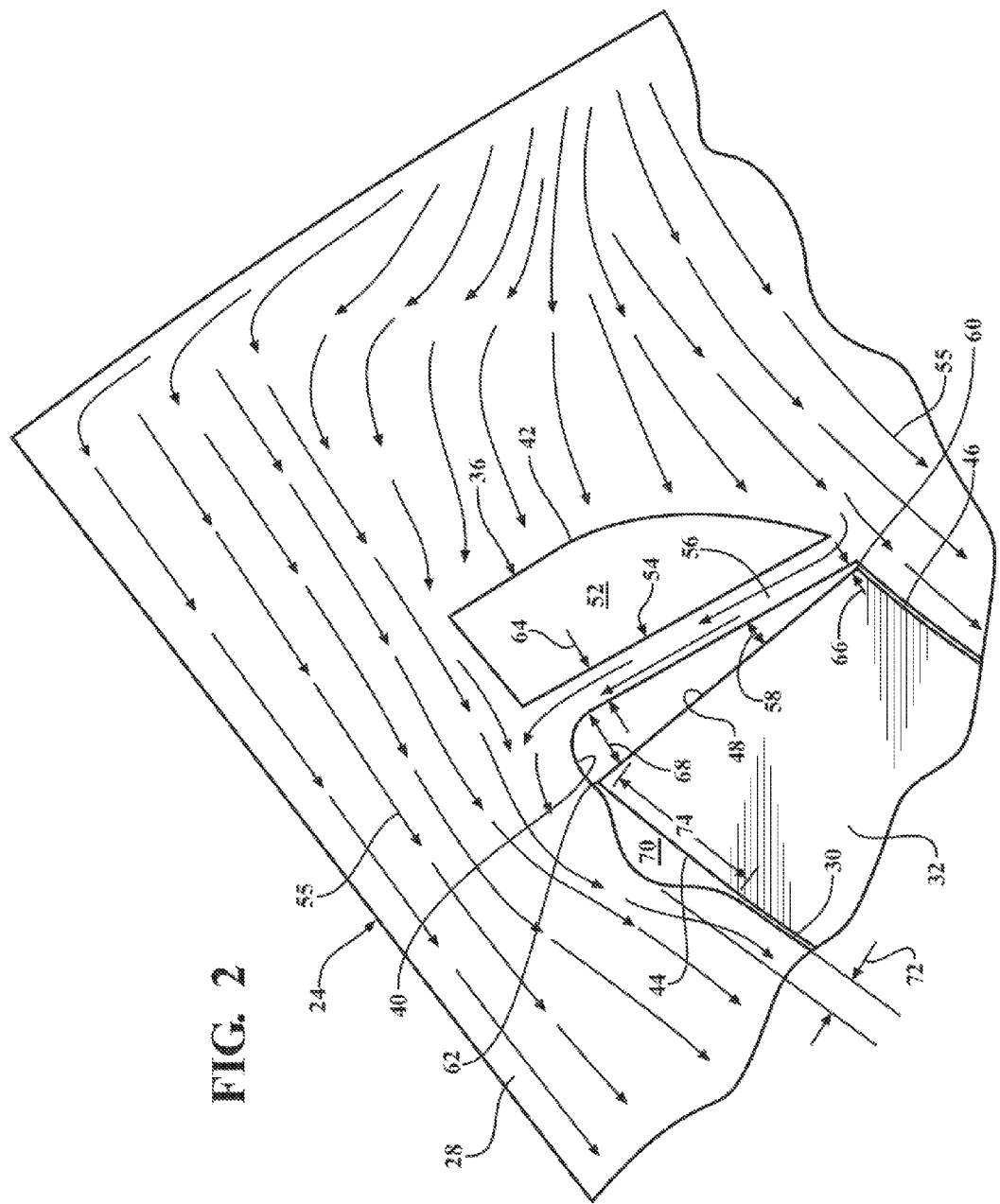

ROTOR BARRIER SHAPING FOR DEMAGNETIZATION MITIGATION IN AN INTERNAL PERMANENT MAGNET MACHINE

TECHNICAL FIELD

The invention generally relates to an internal permanent magnet machine, and more particularly to a rotor assembly for the internal permanent magnet machine.

BACKGROUND

Interior permanent magnet (IPM) machines are favored for fuel cell and hybrid electric vehicle operations due to their desirable characteristics, e.g., good torque density, high overall efficiency, and relatively constant power range, etc. The rotor field in a permanent magnet machine is obtained by virtue of its structure; unlike other machines such as induction, switched or synchronous reluctance machines, in which the field is generated by a stator current supplied by a source. As a result, permanent magnet machines exhibit superior efficiency as compared to other such machines.

An IPM machine may use either ferrite magnets or rare earth magnets, such as NdFeB. However, Ferrite magnets are often at risk for demagnetization under certain operating conditions (e.g., low temperature and high d-axis current). In order to allow the use of less expensive ferrite magnets, some IPM machines may include one or more rotor barriers, which include permanent magnets and/or air gaps (which may be filled with a nonmagnetic material). These rotor layers act as barriers to the permanent magnet field and lower a d-axis or the magnet maxis inductance thereby improving motor saliency. An increase in motor saliency improves motor efficiency and torque performance.

SUMMARY

An Interior Permanent Magnet (IPM) machine is provided. The IPM machine includes a wound stator and a rotor core. The rotor core defines a plurality of cavities, and is configured for magnetically interacting with the wound stator to rotate about an axis of rotation. The IPM machine further includes a plurality of magnets, with one of the plurality of magnets disposed within each of the plurality of cavities. At least one of the plurality of cavities includes an end cavity. The end cavity is arranged along an arcuate path that is oriented convexly outward relative to the axis of rotation. The end cavity defines an arcuate end to the arcuate path. The end cavity defines an air slot disposed at the arcuate end of the end cavity. The air slot is adjacent a radially outermost edge of the magnet disposed within the end cavity relative to the axis of rotation. The rotor core includes a leakage flux path that extends across the air slot, and is spaced from the radially outermost edge of the magnet disposed within the end cavity. The leakage flux path is configured for directing flux away from the magnet.

A rotor assembly for an interior permanent magnet machine is also provided. The rotor assembly includes a rotor core that defines a plurality of cavities. The rotor core is configured for magnetically interacting with a wound stator for rotation about an axis of rotation. The rotor assembly further includes a plurality of ferrite magnets, with one of the plurality of ferrite magnets disposed within each of the plurality of cavities. Each of the plurality of ferrite magnets includes a radial inner surface extending along the axis of rotation and a radial outer surface extending along the axis of rotation. The radial outer surface is offset from the radial inner surface, and the radial inner surface is disposed nearer the axis of rotation than the radial outer surface. At least one of the plurality of cavities includes an end cavity. The end cavity is arranged along an arcuate path that is oriented convexly outward relative to the axis of rotation. The end cavity defines an arcuate end to the arcuate path. The end cavity defines an air slot disposed at the arcuate end of the end cavity, adjacent a radially outermost edge of the magnet disposed within the end cavity. The rotor includes a leakage flux path that extends across the air slot, and is spaced from the radially outermost edge of the magnet disposed within the end cavity. The leakage flux path is configured for directing flux away from the ferrite magnet. The end cavity further defines an air pocket that is disposed along the radial inner surface of the magnet disposed within the end cavity, adjacent the air slot at the arcuate end of the end cavity.

Accordingly, the rotor core, via the air pocket and the leakage flux path, is configured to direct the flux away from a convexly inner corner of the magnet, i.e., the corner of the magnet disposed at the intersection between the radially inner surface and the radially outermost edge of the magnet. Directing the flux away from the convexly inner corner of the magnet prevents the flux from entering the magnet, thereby preventing demagnetization of the magnet and allowing for the use of ferrite magnets in the rotor assembly.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is an enlarged schematic fragmentary cross sectional view of the IPM machine showing a flux flow path through a rotor core.

DETAILED DESCRIPTION

Figure 1:
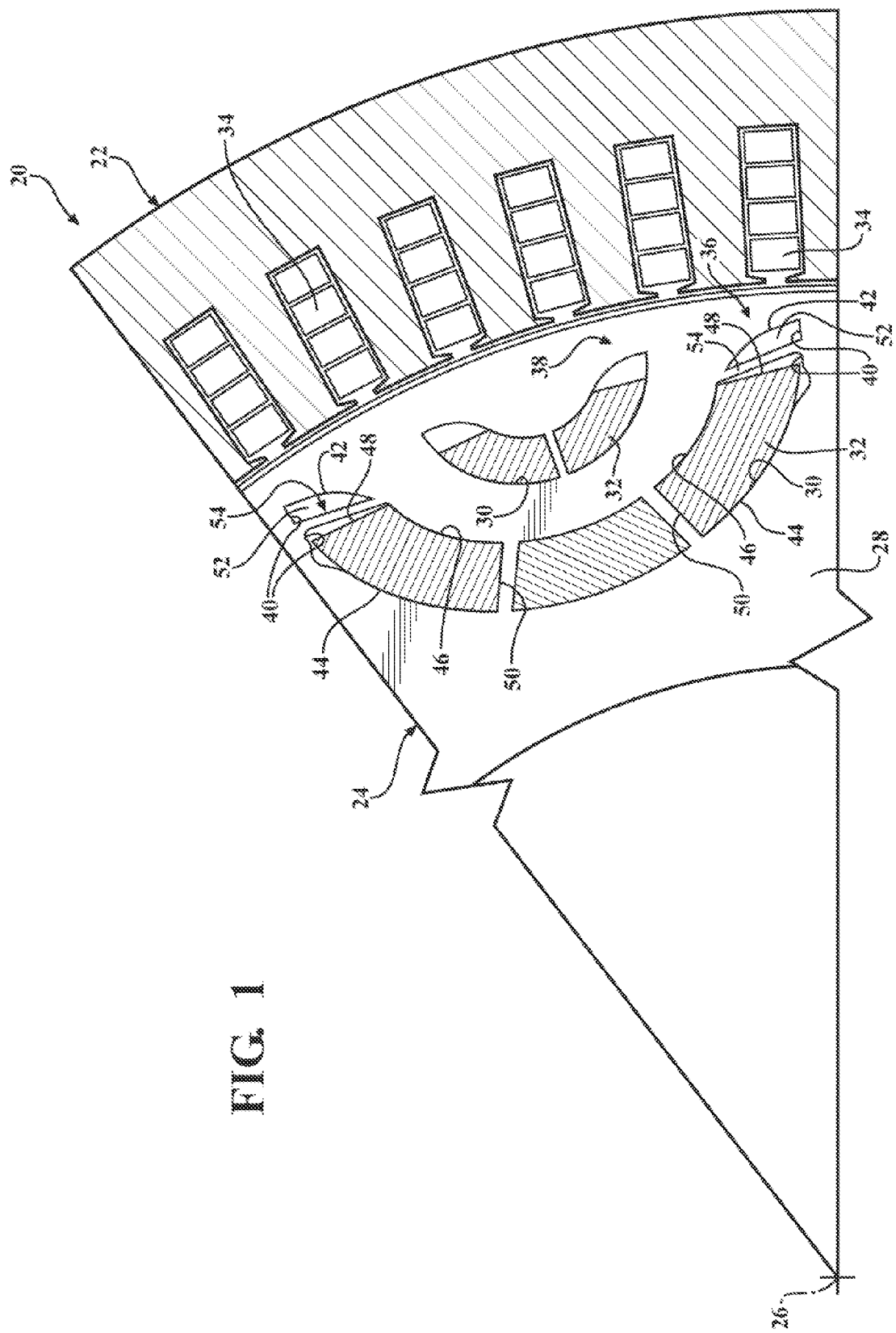
FIG. 1 is a schematic fragmentary cross sectional view of an Internal Permanent Magnet (IPM) machine.

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, an Interior Permanent Magnet machine is generally shown at 20. The IPM machine 20 may include, but is not limited to and electric motor or other similar device.

The IPM machine 20 includes a wound stator 22 and a rotor assembly 24. The rotor assembly 24 is configured for magnetically interacting with the wound stator 22 to rotate relative to the wound stator 22 about an axis of rotation 26. The rotor assembly 24 includes a rotor core 28 that defines a plurality of cavities 30. The cavities 30 may include cutouts, slots, etc. The rotor assembly 24 further includes a plurality of magnets 32, with one of the plurality of magnets 32 disposed within each of the plurality of cavities 30. It should be appreciated that the magnets 32 and the cavities 30 include corresponding cross sectional shapes perpendicular to the axis of rotation 26, such as the arcuate shapes shown, or alternatively rectangular shapes. The wound stator 22 includes a plurality of windings 34 that magnetically interact with the plurality of magnets 32 disposed within the cavities 30 of the rotor core 28 to generate torque, and in run rotation of the rotor core 28 about the axis of rotation 26 relative to the wound stator 22.

The permanent magnets 32 may include any type of magnetic material suitable for use in the IPM machine 20. For example, each of the plurality of magnets 32 may be manufactured from a ferrite magnet, an Alnico magnet, or alternatively from a rare earth magnet, such as but not limited to Neodymium iron boron (NdFeB).

The cavities 30 defined by the rotor core 28 are arranged in one or more layers 36, 38, with each layer shaped to define a cross section perpendicular to the axis of rotation 26 forming a generally arcuate path oriented convexly outward away from the axis of rotation 26. As shown in the Figures, the cavities 30 define two layers, i.e. a first or radially inner layer 36 and a second or radially outer layer 38. However, it should be appreciated that the cavities 30 may define only a single layer, or may define more than the two layers shown. Furthermore, each layer may include any number of cavities 30 therein. As shown, the radially inner layer 36 includes three cavities 30 and the radially outer layer 38 includes two cavities 30. However, the number of cavities 30 in each layer may differ from the exemplary embodiment shown.

At least one of the cavities 30 includes or is defined as an end cavity 40. The end cavity 40 is arranged along the arcuate path of one of the layers 36, 38, and defines an arcuate end 42 to the arcuate path. The arcuate end 42 of the end cavity 40 is disposed at the radially outermost end of the arcuate path, relative to the axis of rotation 26, i.e., the arcuate end 42 is the outermost end of the end cavity 40 located farthest from the axis of rotation 26. The illustrative embodiment shown in FIG. 1 shows two end cavities 40 disposed along the arcuate path defined by the radially inner layer 36 of cavities 30, and no or zero end cavities 40 disposed along the arcuate path defined by the radially outer layer 38 of cavities 30. However, it should be appreciated that the radially outer layer 38 may alternatively include one or more end cavities 40.

Each of the magnets 32 includes a radial inner surface 44 that extends longitudinally along the axis of rotation 26, and a radial outer surface 46 that extends longitudinally along the axis of rotation 26. The radial outer surface 46 is offset from the radial inner surface 44 a distance equal to a thickness of the magnet 32. The radial inner surface 44 is disposed nearer the axis of rotation 26 than the radial outer surface 46. The magnet(s) 32 disposed within the end cavity(ies) 40 includes a radially outermost edge 48 relative to the axis of rotation 26, and a radially innermost edge 50 relative to the axis of rotation 26. The radially outermost edge 48 is disposed adjacent the arcuate end 42 of the end cavity 40, and is disposed farther from the axis of rotation 26 than the radially innermost edge 50.

The end cavity 40 defines an air slot 52 disposed at the arcuate end 42 of the end cavity 40. The air slot 52 is disposed adjacent the radially outermost edge 48 of the magnet 32 disposed within the end cavity 40. The air slot 52 extends along and parallel with the axis of rotation 26, into and out of the page as shown in the Figures. The air slot 52 allows the magnet 32 to move away from the rotor surface and also prevents excessive flux leakage through a leakage flux path 54. Additionally, the air slot 52 shields the rotor magnet 32 from demagnetization.

The rotor core 28 includes and/or defines a leakage flux path 54. As shown in the Figures, the leakage flux path 54 extends across the air slot 52, and is spaced from the radially outermost edge 48 of the magnet 32 disposed within the end cavity 40. It should be appreciated that the leakage flux path 54 extends longitudinally along and parallel with the axis of rotation 26, into and out of the page as shown in the Figures.

The leakage flux path 54 directs flux, generally indicated by arrows 55, away from the magnet 32, thereby preventing the flux from entering the magnet 32 and demagnetizing the magnet 32. The leakage flux path 54 may be integrally formed with the rotor core 28, or may alternatively be mechanically affixed to the rotor core 28 within the end cavity 40.

The leakage flux path 54 may include, for example, a bridge 56, that is oriented in an approximate tangential relationship relative to the axis of rotation 26, and that connects opposing longitudinal sides of the end cavity 40. However, it should be appreciated that the leakage flux path 54 may be configured in some other manner not shown or described herein. The bridge 56 is angled relative to the radially outermost edge 48 of the magnet 32 disposed within the end cavity 40 to define an angle 58 therebetween. The angle 58 preferably includes a value between the range of 10° and 20°. The bridge 56 is angled relative to the radially outermost edge 48 of the magnet 32 to direct flux away from the magnet 32. Accordingly, the bridge 56 directs the flux from a convexly inner corner 60 of the magnet 32, i.e., the corner of the magnet 32 disposed at the intersection of the radial inner surface 44 and the radially outermost edge 48 of the magnet 32, toward a convexly outer corner 62 of the magnet 32, i.e., the corner of the magnet 32 disposed at the intersection of the radial outer surface 46 and the radially outermost edge 48 of the magnet 32. Preferably, the bridge 56 includes a width 64 measured perpendicular to the axis of rotation 26 that is between the range of 0.5 mm and 1.0 mm. The bridge 56 and the magnet 32 disposed within the end cavity 40 are separated by a distance between the range of 0.1 mm and 1.5 mm. More specifically, the convexly inner corner 60 of the magnet 32 is preferably separated from the bridge 56 by a distance 66 between the range of 0.1 mm and 0.2 mm, and the convexly outer corner 62 of the magnet 32 is preferably separated from the bridge 56 by a distance 68 between the range of 0.75 mm and 1.5 mm.

The end cavity 40 may further define an air pocket 70. The air pocket 70 is disposed along the radial inner surface 44 of the magnet 32 disposed within the end cavity 40, adjacent the air slot 52 and near the arcuate end 42 of the end cavity 40, i.e., adjacent the convexly outer corner 62 of the magnet 32. The air pocket 70 extends longitudinally along and parallel with the axis of rotation 26, into and out of the page as shown in the Figures. The air pocket 70 further prevents, or adds resistance to, the rotor field near the outer corner 62, from entering the magnet 32, thus preventing the outer corner 62 from demagnetizing.

The air pocket 70 defines a gap distance 72 between the rotor core 28 and the radial inner surface 44 of the magnet 32 disposed within the end cavity 40, measured perpendicular to the axis of rotation 26. The gap distance 72 may vary between the range of 0.35 mm and 0.75 mm. Furthermore, the air pocket 70 defines a gap length 74 perpendicular to the axis of rotation 26 and tangential or parallel with the radial inner surface 44 of the magnet 32 disposed within the end cavity 40. The gap length 74 may vary between the range of 1.0 mm and 20.0 mm.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An interior permanent magnet machine comprising:
a wound stator;

a rotor core defining a plurality of cavities and configured for magnetically interacting with the wound stator to rotate about an axis of rotation; and a plurality of magnets, with one of the plurality of magnets disposed within each of the plurality of cavities;

wherein at least one of the plurality of cavities includes an end cavity arranged along an arcuate path oriented convexly outward relative to the axis of rotation and defining an arcuate end to the arcuate path;

wherein the end cavity defines an air slot disposed at the arcuate end of the end cavity adjacent a radially outermost edge of the magnet disposed within the end cavity relative to the axis of rotation; and wherein the end cavity includes a leakage flux path extending across the air slot and spaced from the radially outermost edge of the magnet disposed within the end cavity, and configured for directing flux away from the magnet.

2. An interior permanent magnet machine as set forth in claim 1 wherein the leakage flux path includes a bridge oriented in an approximate tangential relationship relative to the axis of rotation and connecting opposing sides of the end cavity.

3. An interior permanent magnet machine as set forth in claim 2 wherein the bridge is angled relative to the radially outermost edge of the magnet disposed within the end cavity to direct flux away from the magnet.

4. An interior permanent magnet machine as set forth in claim 2 wherein the bridge includes a width perpendicular to the axis of rotation, wherein the width of the bridge is between the range of 0.5 mm and 1.0 mm.

5. An interior permanent magnet machine as set forth in claim 4 wherein the bridge and the magnet disposed within the end cavity are separated by a distance between the range of 0.1 mm and 1.5 mm.

6. An interior permanent magnet machine as set forth in claim 1 wherein the leakage flux path is integrally formed with the rotor core.

7. An interior permanent magnet machine as set forth in claim 1 wherein each of the plurality of magnets includes a radial inner surface extending along the axis of rotation and a radial outer surface extending along the axis of rotation, with the radial outer surface offset from the radial inner surface, and with the radial inner surface disposed nearer the axis of rotation than the radial outer surface.

8. An interior permanent magnet machine as set forth in claim 7 wherein the end cavity defines an air pocket disposed along the radial inner surface adjacent the air slot at the arcuate end of the end cavity.

9. An interior permanent magnet machine as set forth in claim 8 wherein the air pocket defines a gap distance perpendicular to the axis of rotation and between the rotor core and the radial inner surface of the magnet disposed within the end cavity.

10. An interior permanent magnet machine as set forth in claim 9 wherein the gap distance is between the range of 0.35 mm and 0.75 mm.

11. An interior permanent magnet machine as set forth in claim 8 wherein the air pocket defines a gap length perpendicular to the axis of rotation and tangential to the radial inner surface of the magnet disposed within the end cavity.

12. An interior permanent magnet machine as set forth in claim 11 wherein the gap length is between the range of 1.0 mm and 20 mm.

13. An interior permanent magnet machine as set forth in claim 1 wherein each of the plurality of magnets includes a ferrite magnet.

14. A rotor assembly for an interior permanent magnet machine, the rotor assembly comprising:

a rotor core defining a plurality of cavities and configured for magnetically interacting with a wound stator for rotation about an axis of rotation; and a plurality of ferrite magnets, with one of the plurality of ferrite magnets disposed within each of the plurality of cavities;

wherein each of the plurality of ferrite magnets includes a radial inner surface extending along the axis of rotation and a radial outer surface extending along the axis of rotation, with the radial outer surface offset from the radial inner surface, and with the radial inner surface disposed nearer the axis of rotation than the radial outer surface;

wherein at least one of the plurality of cavities includes an end cavity arranged along an arcuate path oriented convexly outward relative to the axis of rotation and defining an arcuate end to the arcuate path;

wherein the end cavity defines an air slot disposed at the arcuate end of the end cavity adjacent a radially outermost edge of the magnet disposed within the end cavity;

wherein the end cavity includes a leakage flux path extending across the air slot and spaced from the radially outermost edge of the magnet disposed within the end cavity, and configured for directing flux away from the ferrite magnet; and wherein the end cavity defines an air pocket disposed along the radial inner surface of the magnet disposed within the end cavity, adjacent the air slot at the arcuate end of the end cavity.

15. A rotor assembly as set forth in claim 14 wherein the leakage flux path includes a bridge connecting opposing sides of the end cavity and oriented in an approximate tangential relationship relative to the axis of rotation and angled relative to the radially outermost edge of the magnet disposed within the end cavity to direct flux away from the magnet.

16. A rotor assembly as set forth in claim 15 wherein the bridge includes a width perpendicular to the axis of rotation, wherein the width of the bridge is between the range of 0.5 mm and 1.0 mm.

17. A rotor assembly as set forth in claim 14 wherein the air pocket defines a gap distance perpendicular to the axis of rotation and between the rotor core and the radial inner surface of the ferrite magnet disposed within the end cavity.

18. A rotor assembly as set forth in claim 17 wherein the gap distance is between the range of 0.35 mm and 0.75 mm.

19. A rotor assembly as set forth in claim 14 wherein the air pocket defines a gap length perpendicular to the axis of rotation and tangential to the radial inner surface of the ferrite magnet disposed within the end cavity.

20. A rotor assembly as set forth in claim 19 wherein the gap length is between the range of 1.0 mm and 20 mm.

\* \* \* \* \*